United States Patent [19]

Taue et al.

[11] Patent Number: 5,014,671
[45] Date of Patent: May 14, 1991

[54] HIGH PRESSURE FUEL INJECTION UNIT FOR ENGINES

[75] Inventors: Jun Taue; Osamu Maeda, both of Iwata, Japan

[73] Assignee: Yamaha Hatsudoki Kabushiki Kaisha, Iwata, Japan

[21] Appl. No.: 457,550

[22] Filed: Dec. 27, 1989

[30] Foreign Application Priority Data

Dec. 29, 1988 [JP] Japan .................................. 63-333510
Apr. 26, 1989 [JP] Japan .................................. 1-104777

[51] Int. Cl.$^5$ ........................................... F02M 47/02
[52] U.S. Cl. ..................... 123/447; 239/88; 239/585
[58] Field of Search ................... 123/446, 447; 239/88, 239/91, 96, 533.3–533.12, 585

[56] References Cited

U.S. PATENT DOCUMENTS 4,826,080  5/1989  Ganser ............................... 239/88

FOREIGN PATENT DOCUMENTS

333096  9/1989  European Pat. Off. .............. 239/88
333097  9/1989  European Pat. Off. .............. 239/88
224456  9/1989  Japan .................................. 123/447

Primary Examiner—Tony M. Argenbright
Attorney, Agent, or Firm—Ernest A. Beutler

[57] ABSTRACT

An accumulator type of fuel injection nozzle that permits greater control of the desired fuel discharge rate by achieving a triangular form of discharge with lesser amount of fuel being discharged during initial opening of the injection nozzle. This is achieved by selecting the preload of a spring that urges the injection valve to its closed position in accordance with formula set forth herein. The load and speed of the engine is controlled by varying the duty cycle of the injection nozzle and the pressure of the fuel supply to it.

6 Claims, 5 Drawing Sheets

HIGH PRESSURE FUEL INJECTION UNIT FOR ENGINES

BACKGROUND OF THE INVENTION

This invention relates to an improved high pressure fuel injection unit for engines and more particularly to an improved accumulator type fuel injection nozzle that will provide the desired degree of fuel discharge with a simple valving and control arrangement.

There is a very popular type of fuel injection system that employs an accumulator type of fuel injection nozzle. With this type of system, fuel is delivered under pressure to an accumulator chamber and a flow controlling injection valve is slidably supported in that chamber and controls the flow from the chamber to the engine through a nozzle port. An actuating member is slidably supported within a smaller control chamber and is associated with the fuel controlling injection valve for effecting opening of the injection valve and closing of it. The control chamber is charged with fuel under pressure from the injection system, normally from the accumulator chamber, and a relief valve selectively dumps the pressure in the control chamber. The pressure differences acting on the actuating member then cause the injection valve to open and discharge fuel. This type of injection nozzle is, as noted, very popular and highly effective.

In conjunction with certain types of engine applications, for example, diesel engines, it is known that it is extremely important to control the timing and amount of fuel injection during the injection cycle. It has been found that it is desirable to provide a low initial amount of fuel injection when the injector valve first opens and then an increasing amount of fuel flow is desired. This type of arrangement is effective in controlling the operation of the diesel engine and particularly so as to insure favorable exhaust gas conditions. That is, the emission control of a diesel engine is particularly dependent upon the timing of the fuel injection.

Most accumulator type injection nozzles of the type described, however, do not lend themselves to tailoring of the flow to varying rates during the injection cycle. A wide variety of arrangements have been incorporated for attempting to provide a lesser than normal amount of fuel discharge during the initial fuel valve opening. One way this can be done is by supplying a pair of control valves that operate to control the pressure in the accumulator chamber, each of which is operated by a separate electromagnet. Although such devices can be practical, they become quite complicated and expensive. In addition, the additional circuitry required makes the injector nozzle quite complicated.

It is, therefore, a principal object of this invention to provide an improved high pressure fuel injection unit for an engine.

It is a further object of this invention to provide an improved high pressure accumulator type injection nozzle in which the amount of initial fuel discharge can be restricted from conventional systems through a very simple and highly effective manner.

It is a further object of this invention to provide an improved injector nozzle of the accumulator type wherein a biasing spring arrangement is incorporated that is tailored so as to insure that the proper rates and timing of fuel injection can be achieved without requiring additional control valves and valving elements.

SUMMARY OF THE INVENTION

This invention is adapted to be embodied in an accumulator type of injection nozzle that is comprised of an outer housing defining an accumulator chamber adapted to be supplied with high pressure fuel. A nozzle port leads from the port leads from the accumulator chamber and an injector valve is movable between a closed position and an open position for controlling the discharge of fuel from the accumulator chamber through the nozzle port. A control chamber is also provided for receiving pressurized fuel and an actuating member is supported for movement within the control chamber. Biasing spring means act on the actuating member in the injection valve closing direction. The actuating member and the biasing spring are associated with the injector valve for retaining the injector valve in its closed position when the control chamber is pressurized and for movement of the injector valve to its opened position when the pressure is relieved in the control chamber. Relief valve means are movable between a closed position for maintaining pressure in the control chamber and an open position for relieving the pressure in the control chamber for effecting fuel discharge through the nozzle port. In accordance with the invention, the preload of the biasing spring means is set so as to satisfy the following conditions:

$$PA\,(AP2-AZ-\tfrac{1}{2}AP1)-\tfrac{1}{2}PB\,AP1-KN$$
$$hN < FSET < PA(AP2-AZ)-PB\,AP1-KN\,hN$$

wherein

PA equals pressure in the accumulator chamber;
PB equals pressure within the control chamber when the relief valve is opened;
AP1 equals the cross sectional area of the larger diameter portion of the injector valve body;
AP2 equals the cross sectional area of the smaller diameter portion of the actuating member;
AZ equals the cross sectional area of the fuel injection nozzle;
KN equals the spring constant of the spring means;
hN equals spring deformation of the biasing spring; and
FSET equals the preload for the biasing spring.

Another feature of the invention is adapted to be embodied in an accumulator type of injection nozzle of the type described in the preceding paragraph. In accordance with this feature of the invention, the preload of the biasing spring is set within the following conditions:

$$PA(AP2-AZ)+PG\,AZ-PBO$$
$$AP1 > FSET > PA(AP2-AZ)+PG\,AZ-KN$$
$$hN+\tfrac{1}{2}(PBU-PBD)\,AP1$$

wherein

PA equals the pressure in the accumulator chamber;
PBO equals the pressure within the control chamber while the injection valve body closes the injection nozzle and with the relief valve opened;
PBU equals the pressure within the control chamber while the injection valve is opening with the relief valve opened;
PBD equals pressure within the control chamber while the injection valve is closing with the relief valve closed;
PG equals pressure within the combustion chamber;
AP1 equals cross sectional area of the larger diameter portion of the injection valve;

AP2 equals the cross sectional area of the actuating member;
AZ equals the cross sectional area of the nozzle port;
KN equals spring constant of the spring means;
hN equals spring deflection; and
FSET equals the initial preload of the biasing spring.

DETAILED DESCRIPTION OF THE PREFERRED EMBODIMENT OF THE INVENTION

Figure 1:
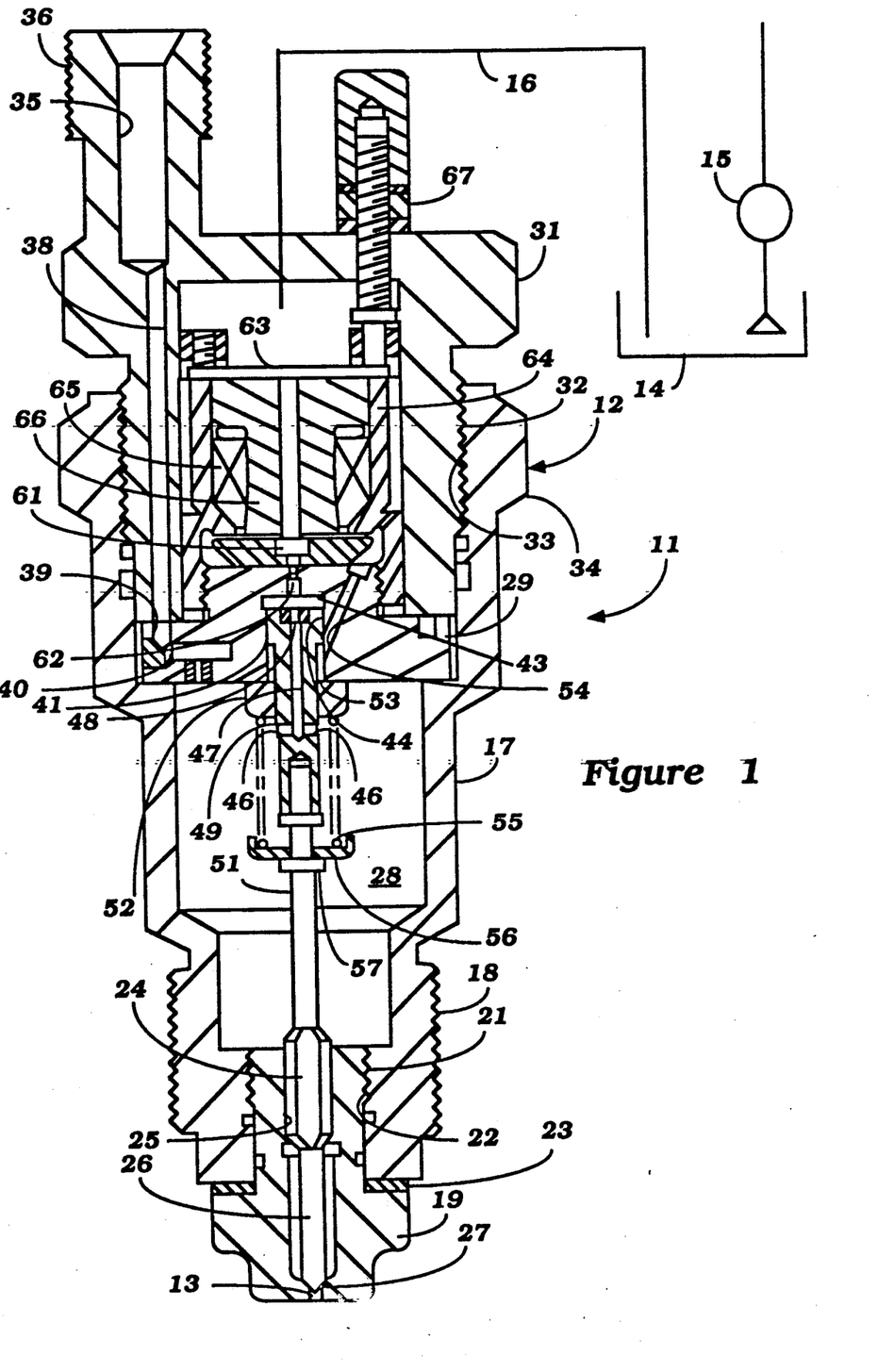
FIG. 1 is a cross sectional view of an accumulator type injection nozzle constructed in accordance with an embodiment of the invention in combination with the fuel supply system, shown in phantom.

Referring to the drawings and initially to FIG. 1, a fuel injection nozzle constructed in accordance with an embodiment of the invention is identified generally by the reference numeral 11. The injection nozzle 11 is comprised of an outer housing assembly, indicated generally by the reference numeral 12 that is adapted to be mounted, in a manner to be described, in the cylinder head of an internal combustion engine with a nozzle port 13 communicating with the combustion chamber for delivering fuel to it in a manner to be described. Rather than direct cylinder injection, the invention may be utilized in conjunction with manifold injection systems but the invention has particular utility with direct injection, for example as used with high speed diesel engines.

Fuel is supplied to the injection nozzle 11 from a remotely positioned fuel tank 14 by means of a high pressure pump 15 at pressures in the range of about 500 kg/cm². Return fuel is returned back to the fuel tank 14 through a return line 16. The fuel delivery and return systems per se from no part of the invention. For that reason they have been illustrated only schematically.

The outer housing 12 is comprised of a lower piece 17 that has a threaded lower end 18 that is adapted to be threaded into a suitable aperture in the cylinder head of the associated engine (not shown) in a known manner. The nozzle port 13 is defined by a tip 19 that has a threaded portion 21 that is received in a threaded bore 22 formed at the lower end of the housing piece 17. An adjusting shim 23 is interposed between the nozzle piece 19 and housing 17 for length adjustment.

An injection valve 24 is slidably supported within a bore 25 of the nozzle piece 19 and has a reduced diameter portion 26 and a flow controlling tip 27 which, in the closed position, closes the injection nozzle port 13. The valve portion 26 has interrupted enlargements for slidably supporting the injection valve 24 in the bore 25 in a known manner.

An accumulator chamber 28 is formed above the bore 25 by the housing piece 17. The accumulator chamber 28 is closed at its upper end by means of a closure plate 29 that is held against a shoulder in the housing piece 17 by a second housing piece 31. The housing piece 31 has a threaded portion 32 that is received within a threaded bore 33 of the housing piece 17 so as to hold the closure plate 29 in position and maintain the chamber 28 in a sealed condition, except as is hereinafter noted. Externally of the threaded opening 33, the housing piece 17 is formed with a hexagonal portion 34 so as to facilitate insertion into the threaded bore of the cylinder head.

The housing piece 31 is formed with an inlet conduit 35 that has a threaded external portion 36 so as to receive a fitting for connecting a supply line 37 extending from the pressure pump 15 to the inlet conduit 35.

The inlet conduit 35, which is generally drilled opening, is intersected by a further drilled passageway 38 that extends axially along the housing piece 31 at one side thereof and which communicates at its lower end with a corresponding circumferential groove 39 formed in the upper face of the closure plate 29. The groove 39 is intersected by a passage 40 which delivers fuel under pressure to the accumulator chamber 28 through an orifice 41.

A control chamber 43 is formed in the closure plate 29 by means of a bore 44 that extends toward the lower end of the closure plate 29. The injection valve 24 has a large diameter generally cylindrical actuator portion 45 that is slidably supported within the bore 44. Restricted orifices 46 communicate the accumulator chamber 28 with an axial passage 47 of the portion 45. The control chamber 43 communicates with the passage 47 through an orifice 48 to receive the pressurized fluid and normally urge the injection valve 24 toward its downward or closed position. The injection valve 24 is provided with a small diameter portion 49 of a diameter that is smaller than the diameter of the portion 45 but which is larger in diameter than a shank portion 51 of the injection valve 24.

A sealing member, indicated generally by the reference numeral 52 and which may have a generally annular shape, is formed with a bore that is complementary to the injection valve portion 49 so as to provide sliding support for it. An area 53 is formed above the sealing member 52 between the bore 44 and the small diameter portion 49. This area 53 is vented to return pressure through a return line 54 so that the higher pressure acting in the control chamber 43 will be sufficient to hold the injection valve 24 in its closed position due to the different forces provided for by the smaller effective area of the portion 49 from the portion 45. As a result, the pressure in the control chamber 43 is, by itself, sufficient to maintain the injection valve 26 in a seated position within the nozzle port 13.

Even though this pressure sealing may be adequate for purposes to be described, a biasing coil compression spring 55 encircles the injection valve 24 and bears against the sealing member 52 at its upper end to seat this member. The lower end of this spring 55 engages a cup shaped retainer 56 that is held axially in position against a shoulder formed by an enlargement 57 on the injection valve 24 so as to further assist in maintaining the injection valve 24 in the closed position as shown in the drawings and to achieve a delayed or reduced amount of initial fuel injected when the injection valve 24 opens.

A relief valve 61 is supported within the upper end of the closure plate 29 and controls the opening of the relief valve seat 62 formed in the upper end of the closure plate 29 and communicating with the control chamber 43. The relief valve 61 is biased toward its closed position with the valve seat 62 by a leaf type spring 63 which has its tension adjusted by a screw (not shown).

The relief valve 61 when opened will permit the fuel in the control chamber 43 to return to the tank 14 through a return fitting (not shown) that extends axially through the end of the housing piece 31 parallel to the inlet passageway 35. This return passageway communicates with the conduit 16. Fuel can flow from the relief valve seat 62 to the return passageway through suitable internal passageways or clearances to permit this return flow, which is relatively small in volume.

The relief valve 61 is opened and closed so as to control the discharge of fuel from the nozzle port 13 by means of an electromagnetic assembly, indicated generally by the reference numeral 64 and which may be of any known type. The electromagnetic assembly 64 is comprised of a solenoid coil or winding 65 which encircles an armature 66. The armature 66 is formed with a bore that slidably supports an extension of the relief valve which is also acted on by the leaf spring 63.

A circuit is provided for energizing the coil 65 of the electromagnet assembly 64 for opening and closing the relief valve 61. This circuit includes a pair of terminal posts 67 (only one of which appears in the drawings) that extend through the upper end of the housing piece 31. Electrical tab connectors are held on the posts 67 in electrical contact so as to afford attachment to an appropriate lead of a circuit (not shown).

As has been noted, it has been determined through observation and experimental results that the desired reduction in initial amount of fuel discharged by the nozzle 11 during initial opening of the relief valve 61 to the amount desired can be controlled through the setting of the preload of the spring 55 and its characteristics. These results can be achieved when the following relationship is established:

$$PA\ (AP2-AZ-\tfrac{1}{2}AP1)-\tfrac{1}{2}PB\ AP1-KN$$
$$hN < FSET < PA(AP2-AZ)-PB\ AP1-KN\ hN \qquad (1)$$

where
PA: pressure within accumulator chamber.
PB: pressure within control chamber 43 while relief port 61 is opened,
AP1: cross sectional area of larger diameter portion of injection valve 45,
AP2: cross sectional area of smaller diameter portion of injection valve body 49,
AZ: cross sectional area of fuel injection nozzle port 13,
KN: spring constant spring 55,
hN: spring deformation, and
FSET: preload for spring.

Since the annular chamber 53 is communicated with the fuel tank 14 through the passageway 64, it can be assumed that the pressure PC within the annular chamber 53 is substantially zero.

Figure 2:
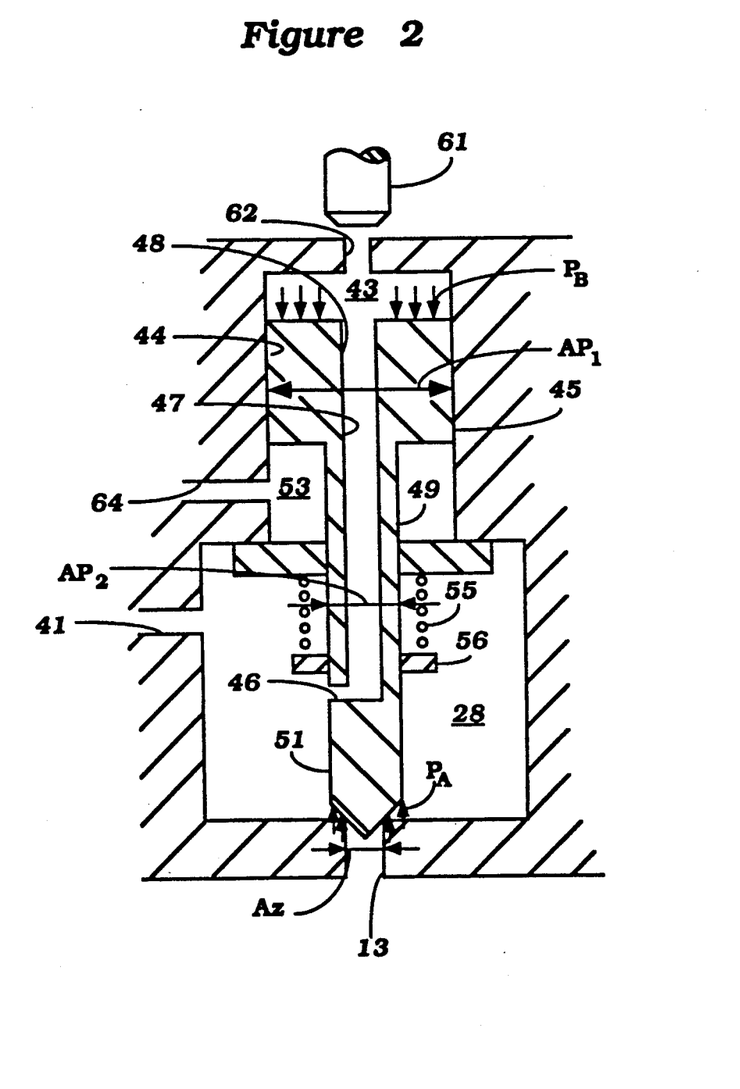
FIG. 2 is a cross sectional view, in part similar to FIG. 1, and shows the forces acting on the valve assembly.

As a result, the forces F+ acting to open the injection valve 24 and the forces F− acting to close the injection valve 24 can be given from the following equations:

$$F+ = PA(AP2-AZ) \qquad (2)$$

$$F- = FSET + PB\ AP1 + KN\ hN \qquad (3)$$

This assumes that the relief valve 61 is closed so that the PB equals PA.

Once the electromagnet 64 is energized, the relief valve 61 will open and pressure can leave the control chamber 43 through the relief valve seat 62 and the injection valve 24 begins to open. Then, F+ becomes larger than F− and the valve opening force F0 for opening the injection valve 23 may be expressed by the following equation:

$$F0 = F+ - F- \qquad (4)$$

When the electromagnet 64 is deenergized, the injection valve 23 will be urged to its closed position since F+ becomes smaller than F− and the valve closing force FC may be expressed by the following equation:

$$FC = F- - F+ \qquad (5)$$

In equation 4, the pressure (3), the pressure PB is the pressure within the control chamber 43 when the relief valve 61 is open. PB in equation 5 is the pressure in control chamber 43 when the relief valve 61 is closed, that is, PB equals PA.

In order to make the amount of fuel injection smaller during the initial stages, it has been confirmed by experimentation that the function of the control chamber 43 as a damping chamber permits the desired result by establishing the following conditions:

$$FC > F0 \qquad (6)$$

and $$F0 > 0 \qquad (7)$$

By doing this, it has been determined that the preload of the coil compression spring 55 can be set so as to reduce the opening speed of the injection valve 24 and, therefore, to delay the amount of fuel injection and also to permit more rapid closing of the injection valve 24. Therefore, since the fuel injection nozzle 24 can be opened slowly and closed rapidly by appropriately selecting the preload of the spring 55, then the fuel injection rate can be appropriately tailored so as to achieve the desired results.

Figure 3:
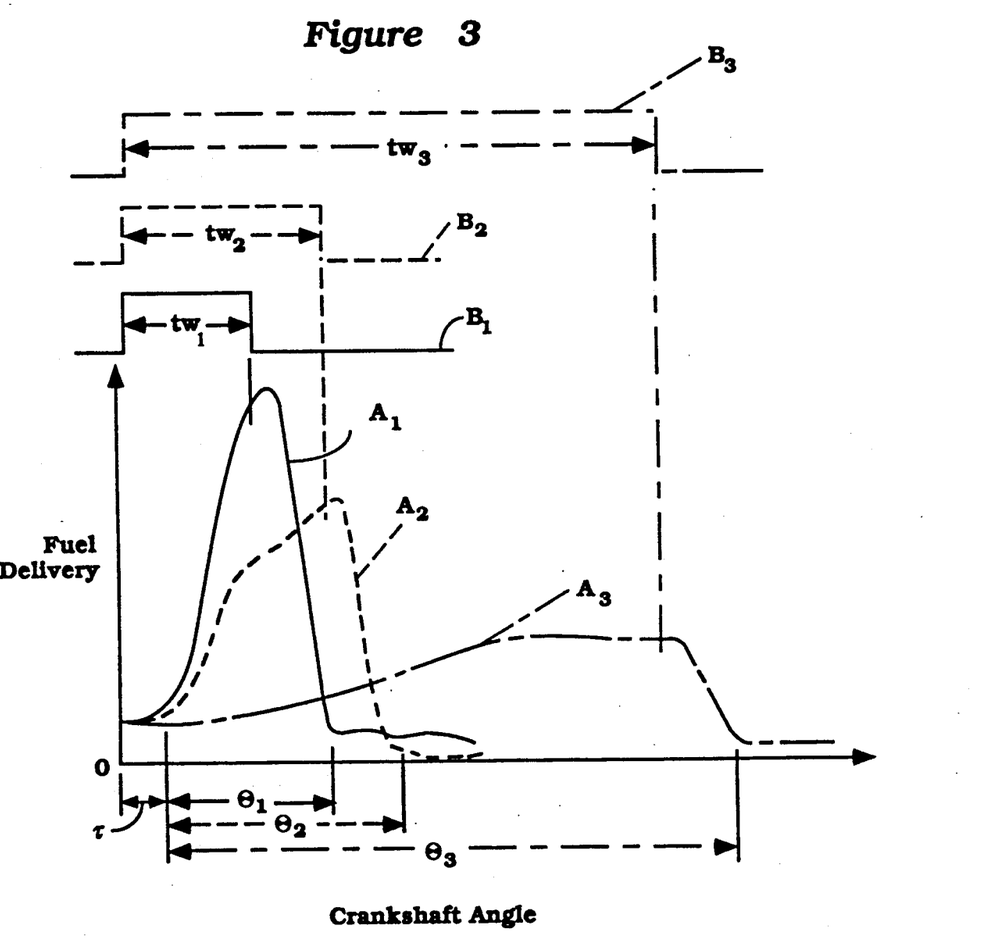
FIG. 3 is a view of engine crank angle versus fuel discharge showing the fuel discharge of the injection nozzle in accordance with an embodiment of the invention.

This may be best understood by reference to FIG. 3 wherein there are graphs shown for the fuel injection rates relative to crankshaft angle and/or time. The curves A1, A2 and A3 show fuel injection rates for high, medium and low speed operating ranges for the engine. B1, B2 and B3 show the duty cycles of the solenoid or electromagnet 64 which are energized for the times tw1, tw2 and tw3, respectively. It should also be noted that as the speed increases the pressure of the fuel delivered from the pump 15 to the injection nozzle 11 is raised by any suitable pressure control system. The curves A1, A2 and A3 show fuel injection rates that are triangular in configuration generally with smaller injection rates at the earlier stage of fuel injection and achieving constant amounts of fuel injection by varying the pulse widths as aforenoted.

It should be noted in conjunction with FIG. 3, that there is a delay time $\tau$ which exists between the energization of the solenoid or electromagnet 64 and the actual beginning of delivery of fuel.

Figure 4:
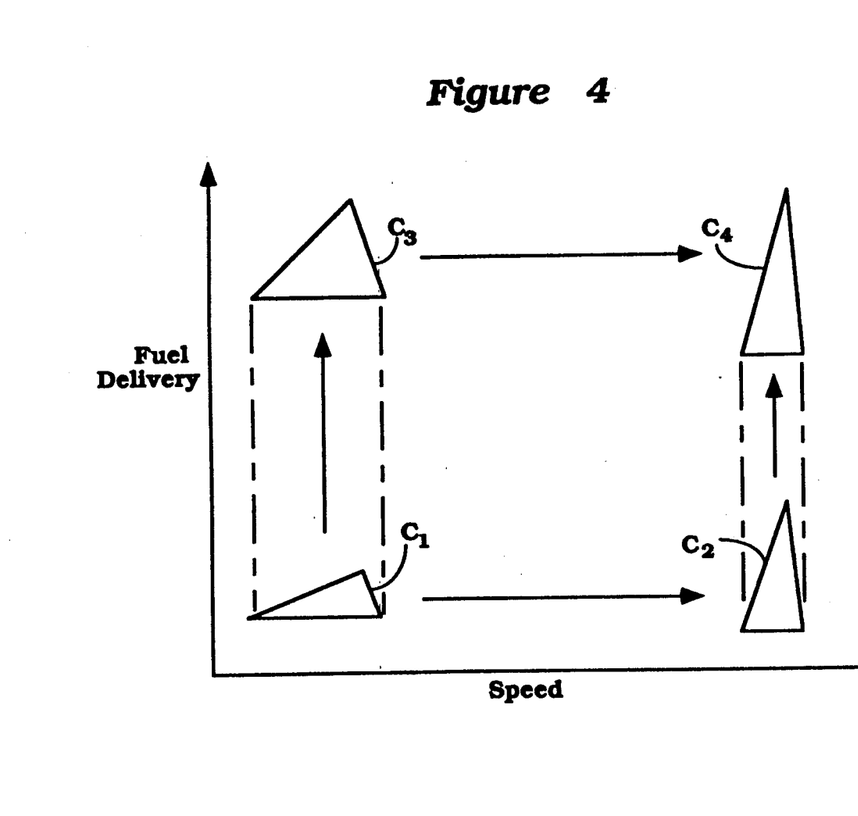
FIG. 4 is a speed to injection curve showing various load and speed conditions.

FIG. 4 shows a plot of varying triangular shape injection curves under varying speeds and loads. The curves C1 and C2 show the fuel delivery at low load and at low and high speeds, respectively. It should be noted that the amount of fuel delivered is approximately the same but the width or duration of timing is increased at low speeds while the amplitude or height is increased at high speeds by increasing the pressure and decreasing the duty cycle time.

Also, the curves C3 and C4 show the fuel delivery under higher loads at the aforenoted low and high speed conditions, respectively. It should be seen that the pulse duration is maintained the same but the amount of fuel delivery is increased by increasing the pressure. Hence, by varying these parameters it is possible to obtain the desired amount of fuel injection.

Figure 5:
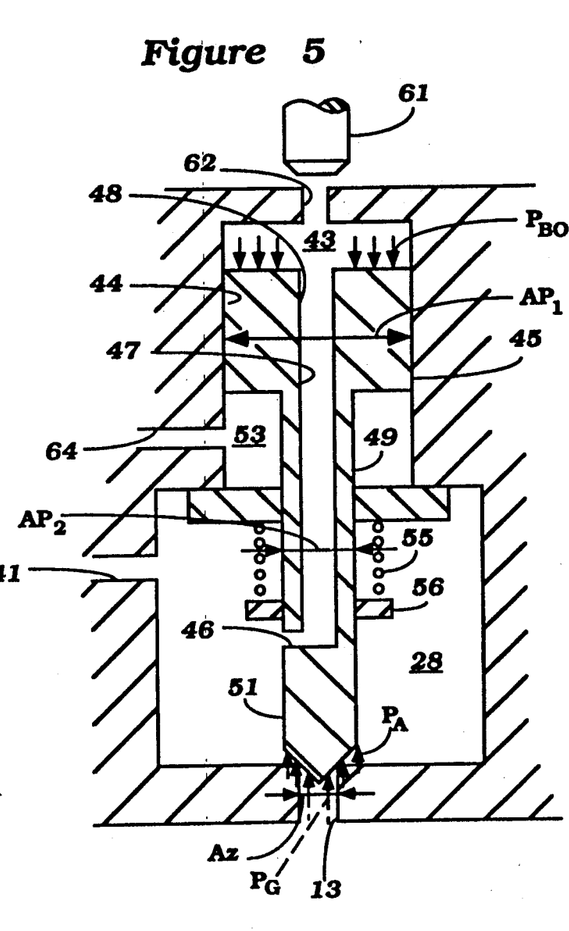
FIG. 5 is a schematic cross sectional view, in part similar to FIG. 2, showing the load conditions in relation to combustion chamber pressure when the injection valve is closed and the relief valve has initially opened.

The aforedescribed conditions have been made independent of the pressure in the combustion chamber downstream of the nozzle port 13, this pressure being indicated as PG. However, in setting the load or preload for the coil compression spring 55 it has been determined that the desired characteristics can be obtained by setting the preload in accordance with the following equation:

$$PA(AP2-AZ)+PG\ AZ-PB0 \\ AP1 > FSET > PA(AP2-AZ)+PG\ AZ-KN \\ hN+\tfrac{1}{2}(PBU-PBD)\ AP1 \tag{11}$$

where
PA pressure within accumulator chamber,
PB0: pressure within control chamber while injection valve is closed and with relief valve opened,
PBU: pressure within control chamber while injection valve is opening with relieve valve opened,
PBD: pressure within control chamber while injection valve is closing with relief valve closed,
PG: pressure within combustion chamber,
AP1: cross sectional area of larger diameter portion of injection valve,
AP2: cross sectional area of smaller diameter portion of injection valve,
AZ: cross sectional area of fuel injection nozzle,
KN: spring constant,
hN: spring deformation, and
FSET preload for spring.

Since the annular chamber 53 is vented through the fuel tank 14 through the conduit 64, the pressure PC in this chamber may be considered to be zero.

As before, the forces tending to respectively open and close the injection valve 24 before it is opened and with the relief valve 61 open to relief the pressure in the control chamber 43 can be given by the following equations:

$$F+0=PA(AP2-AZ)+PG\ AZ \tag{12}$$

$$F-0=FSET+PB0\ AP1 \tag{13}$$

Figure 6:
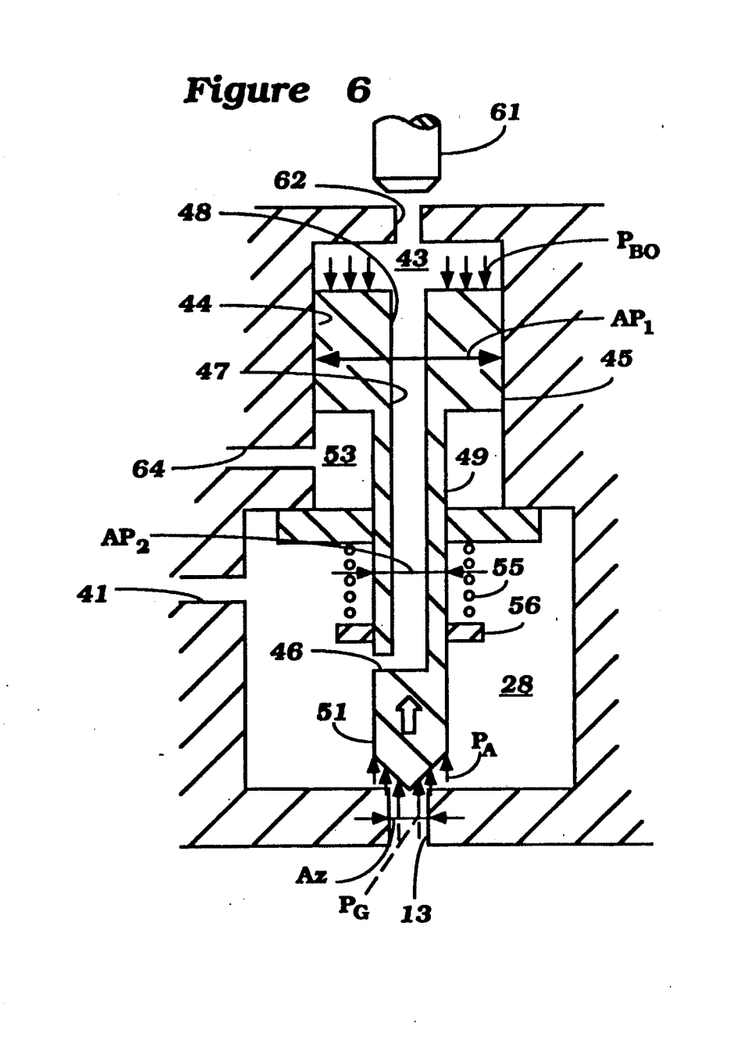
FIG. 6 is a cross sectional view, in part similar to FIG. 5, showing the condition when the injection valve has opened.

The forces $F+U$ and $F-U$ acting to open and close, respectively, the injection valve 24 while the injection valve is opening are given by the following equations:

$$F+U=PA(AP2-AZ)+PG\ AZ \tag{14}$$

$$F-U=FSET+PBU\ AP1+CN\ VNU+KN\ hN \tag{15}$$

where
CN: viscous resistance coefficient, and
VNU: rising speed of injection valve.

Figure 7:
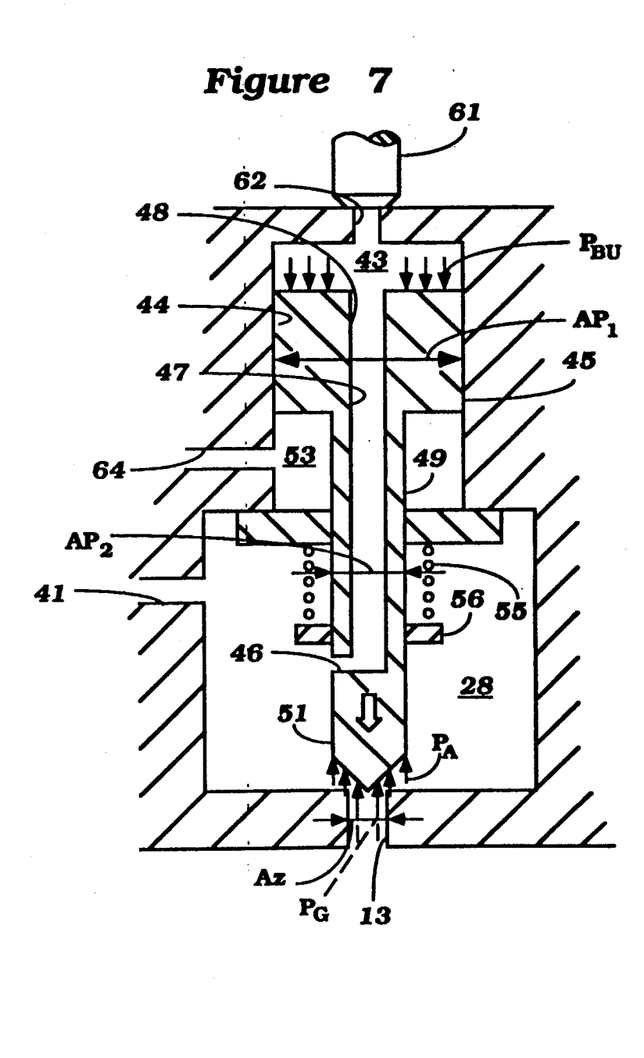
FIG. 7 is a cross sectional view, in part similar to FIGS. 5 and 6, and shows the condition when the relief valve has closed and immediately prior to the closing of the injection valve.

The forces $F+D$ and $F-D$ acting to open and close, respectively, the injection valve 24 while the injection valve 24 is closing with the relief valve 61 closed are given by the following equations:

$$F+D=PA(AP2-AZ)+PG\ AZ \tag{16}$$

$$F-D=FSET+PBD\ AP1+CN\ VND+KN\ hN \tag{17}$$

where
VND: closing speed of injection valve.

Obviously, to make the injection valve 24 open, the following relationship must exist:

$$F+0 > F-0 \tag{18}$$

In order to make the fuel injection wedge shaped and smaller at the earlier stage of valve opening, the following relationship must exist:

$$F+U=F-U \tag{19}$$

$$F+D=F-D \tag{20}$$

and $$VNU < VND$$

This is because it is necessary that the opening speed VNU and closing speed VND of the injection valve 24 be nearly constant and the absolute value of the speed VND is larger than that of the speed VNU. By introducing equation 11 and solving the aforenoted equations, it can be determined that the preset load for the coil compression spring 55 within a range fulfilling the conditions of equation 11 it is possible to make the speed of the injection valve while opening to open the fuel injection nozzle smaller than that while closing to close the fuel injection nozzle 13 even in the case when the pressure in the combustion chamber is considered. Therefore, under all conditions meeting the aforenoted relationships, it is possible to obtain the desired fuel flow characteristics. That is, the fuel flow is less during initial opening and then accelerates as the valve opens further.

It is to be understood that the foregoing description is that of a preferred embodiment of the invention and that various changes and modifications may be made without departing from the spirit and scope of the invention as set forth in the appended claims.

We claim:

1. An accumulator type of injection nozzle comprised of an outer housing defining an accumulator chamber adapted to be supplied with high pressure fuel, a nozzle port leading from said accumulator chamber, an injection valve moveable between a closed position and an opened position for controlling the discharge of fuel from said accumulator chamber through said nozzle port, a control chamber for receiving pressurized fuel, an actuating member supported for movement within said control chamber and a biasing spring acting on said actuating member in the injection valve closing direction, said actuating member and said biasing spring being associated with said injector valve for retaining said injector valve in its closed position when said control chamber is pressurized and for movement of said injector valve to its opened position when pressure is relieved in said control chamber, and relief valve movable between a closed position for maintaining pressure in said control chamber and an opened position for relieving said control chamber for effecting fuel discharge through said nozzle port, the improvement comprising the preload of said biasing spring being set within the following relationship:

$$PA(AP2-AZ-\tfrac{1}{2}AP1)-\tfrac{1}{2}PB\,AP1-KN$$
$$hN < FSET < PA(AP2-AZ)-PB\,AP1-KN\,hN \quad (1)$$

where

PA: pressure within accumulator chamber.
PB: pressure within control chamber 43 while relief port 61 is opened,
AP1: cross sectional area of larger diameter portion of injection valve 45,
AP2: cross sectional area of smaller diameter portion of injection valve body 49,
AZ: cross sectional area of fuel injection nozzle port 13,
KN: spring constant spring 55,
hN: spring deformation, and
FSET: preload for spring.

2. An accumulator type of injection nozzle as set forth in claim 1 wherein the duration of actuation of the relief valve and the pressure of the fuel supplied to the accumulator chamber are varied to vary the load and speed conditions of the engine.

3. An accumulator type of injection nozzle as set forth in claim 2 further including electromagnetic means for operating the relief valve and the duration is controlled by changing the duty cycle of said electromagnet.

4. An accumulator type of injection nozzle comprised of an outer housing defining an accumulator chamber adapted to be supplied with high pressure fuel, a nozzle port leading from said accumulator chamber, an injection valve moveable between a closed position and an opened position for controlling the discharge of fuel from said accumulator chamber through said nozzle port, a control chamber for receiving pressurized fuel, an actuating member supported for movement within said control chamber and a biasing spring acting on said actuating member in the injection valve closing direction, said actuating member and said biasing spring being associated with said injector valve for retaining said injector valve in its closed position when said control chamber is pressurized and for movement of said injector valve to its opened position when pressure is relieved in said control chamber, and relief valve movable between a closed position for maintaining pressure in said control chamber and an opened position for relieving said control chamber for effecting fuel discharge through said nozzle port, the improvement comprising the preload of said biasing spring being set within the following relationship:

$$PA(AP2-AZ)+PG\,AZ-PB0$$
$$AP1 > FSET > PA(AP2-AZ)+PG\,AZ-KN$$
$$hN+\tfrac{1}{2}(PBU-PBD)AP1 \quad (11)$$

where

PA pressure within accumulator chamber,
PB0: pressure within control chamber while injection valve is closed and with relief valve opened,
PBU: pressure within control chamber while injection valve is opening with relieve valve opened,
PBD: pressure within control chamber while injection valve is closing with relief valve closed,
PG: pressure within combustion chamber,
AP1: cross sectional area of larger diameter portion of injection valve,
AP2: cross sectional area of smaller diameter portion of injection valve,
AZ: cross sectional area of fuel injection nozzle,
KN: spring constant,
hN: spring deformation, and
FSET preload for spring.

5. An accumulator type of injection nozzle as set forth in claim 4 wherein the duration of actuation of the relief valve and the pressure of the fuel supplied to the accumulator chamber are varied to vary the load and speed conditions of the engine.

6. An accumulator type of injection nozzle as set forth in claim 5 further including electromagnetic means for operating the relief valve and the duration is controlled by changing the duty cycle of said electromagnet.

* * * * *